United States Patent [19]

Manning

[11] 4,035,126

[45] July 12, 1977

[54] MOLDING APPARATUS

[75] Inventor: Roland Vernon Manning, Salt Lake City, Utah

[73] Assignee: Manning Target Systems, Inc., Salt Lake City, Utah

[21] Appl. No.: 617,321

[22] Filed: Sept. 29, 1975

Related U.S. Application Data

[63] Continuation of Ser. No. 450,660, March 13, 1974, abandoned.

[51] Int. Cl.$^2$ .......................................... B29C 3/06

[52] U.S. Cl. ............................... 425/157; 425/159; 425/261; 425/348 R; 425/360; 425/453; 425/407

[58] Field of Search .......... 425/261, 347, 348, 357, 425/359, 360, 451, 453, 350, 407, 361, 448, 243, 159, 157

[56] References Cited

U.S. PATENT DOCUMENTS

| | | | |
|---|---|---|---|
| 1,537,697 | 5/1925 | Roberts | 425/361 |
| 1,741,694 | 12/1929 | Gottfried | 425/360 |
| 2,064,624 | 12/1936 | Napier | 425/361 |
| 2,300,290 | 10/1942 | Johnson et al. | 425/350 |
| 2,365,804 | 12/1944 | Clerke | 425/357 |
| 3,159,011 | 12/1964 | Kaluzny et al. | 425/350 X |
| 3,431,598 | 3/1969 | Lueddeke et al. | 425/348 R X |

*Primary Examiner*—Robert L. Spicer, Jr.
*Attorney, Agent, or Firm*—Trask & Britt

[57] ABSTRACT

An automated molding apparatus has a continuous movable belt trained about a pair of spaced apart sprocket pulleys rotatably mounted to a main support frame. A plurality of female dies are equidistantly mounted to the belt for mating with a plurality of male dies reciprocatively mounted in a plane above the female dies. A heated feeder is provided for introducing a predetermined amount of melted mix into the female dies prior to mating with the male dies. To insure that the resulting molded product is properly hardened, the female dies are adapted with internal channels connected to a liquid cooling system. The molding apparatus is readily adaptable for hydraulic operation and may be readily automated by an electrically actuated control and timing system.

9 Claims, 5 Drawing Figures

MOLDING APPARATUS

This is a continuation, of application Ser. No. 450,660 filed Mar. 13, 1974, now abandoned.

BACKGROUND OF THE INVENTION

2. Field

This invention is directed to a molding apparatus for forming objects from a heat melted material and particularly to an apparatus and method for producing frangible targets.

2. State of the Art

As the popularity of trap shooting continues to increase, the need for a more economical means for mass producing frangible targets becomes increasingly more important. The frangible clay targets currently in use have gained broad acceptance among trap shooters. These clay targets are designed to be projected from a mechanical throwing arm which imparts a rapid spinning motion to the target during flight. The targets are unique from the standpoint that they are designed to not only withstand stresses of projection and flight but also are designed to break on impact from preferably a single shot pellet.

The popularity of the sport of trap shooting is evidenced by a recent study which has shown that in excess of one billion clay targets are destroyed annually by shooters in the United States alone. In addition, another one-half to one hundred million are broken during transit from the manufacturing plants to the consumer. This high loss of breakage is due primarily to the target's frangible characteristics and their inability to withstand even the slightest shock or stress. Although a large number of frangible targets are still being produced by hand presses, automatic molding machines such as that reported in U. S. Pat. No. 2,300,290 have proven quite successful for relatively large manufacturing operations. However, for on-site, sporadic use, such machines have been found to be economically impractical from both a capital investment and operational standpoint.

OBJECTS OF THE INVENTION

It is, therefore, a primary object of this invention to provide an apparatus and method which is capable of producing frangible targets on-site at minimum investment and operational costs. Another object is to provide a molding apparatus which is fully automated and capable of being operated singly and by unskilled personnel. Still another object of this invention is to provide a molding apparatus which is compact, easily operated and requires minimal operational care. Another object of this invention is to provide a compact, moble molding apparatus capable of being efficiently used on a periodic basis. Other objects of this invention will be apparent from a reading of the disclosure and in viewing the drawings appended thereto.

SUMMARY OF THE INVENTION

These and other objects of this invention are achieved by the apparatus of this invention which includes generally a continuous female die carrying belt trained about spaced-apart sprockets, rotatably mounted to a support member. An overhead male die system is included for mating with the female dies as the belt is moved at predetermined timed intervals about the sprockets. Also provided is a heated feed storage chamber for introducing a specified, predetermined amount of melted mix into the female dies prior to mating with the male dies. To insure that the molded product is hardened under controlled conditions, the female dies are adapted with a cooling system capable of achieving optimal molding temperatures over a specified period of time. In one embodiment of this invention the molding apparatus is adapted for hydraulic operation and automatically sequenced by an electrical timing system.

DESCRIPTION OF THE PREFERRED EMBODIMENT

Figure 1:
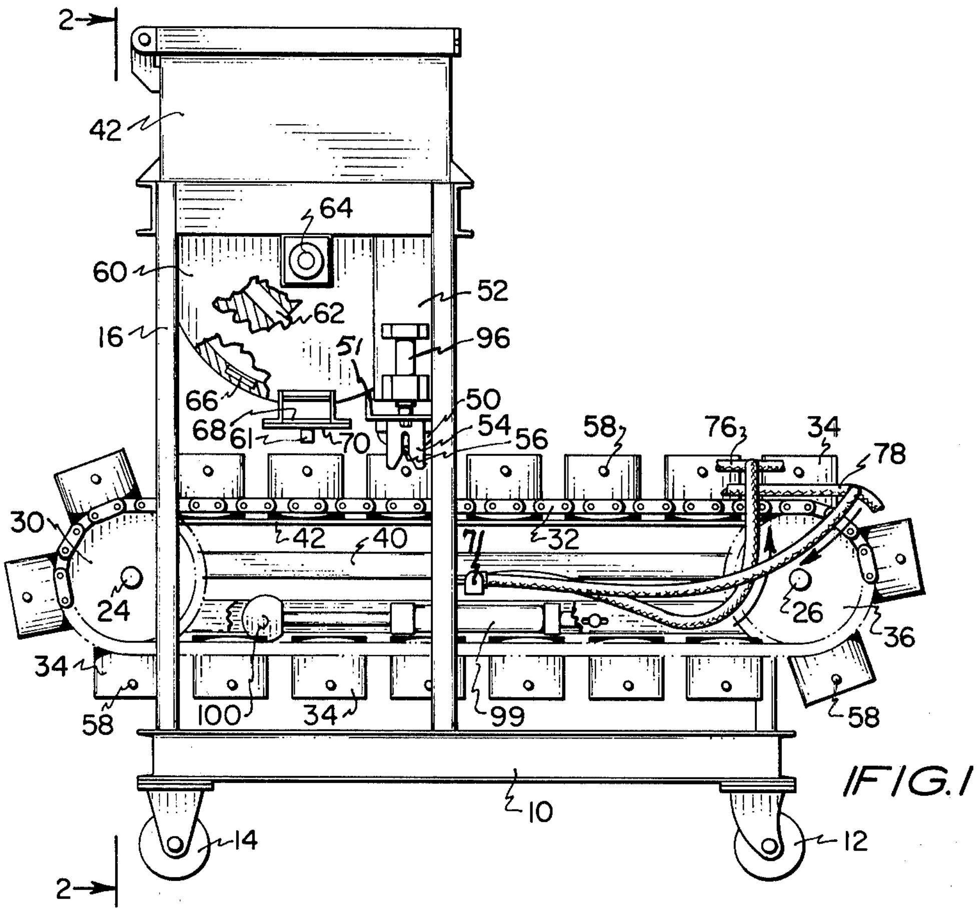
FIG. 1 is a side view of the molding apparatus of this invention with portions cut away for clarity.

As shown in FIGS. 1 through 4, inclusive, the molding apparatus of this invention includes a substantially square base frame member 10, having a pair of swivel casters 12 mounted at one end and a pair of fixed casters 14 mounted at the other end thereof. An upward and vertical extending rectangular framed assembly 16 is mounted in one corner and at one end of the base assembly 10. Adjacent thereto, a second framed assembly 8 is mounted to extend longitudinally along the top side of the base frame member 10. A set of two pillow blocks 20 and 22 is externally mounted to each end section of the second frame member 18. The pillow blocks extend beyond the base members' end pieces and are adapted to receive and support a suspended, journaled, first and second rotatable shaft 24 and 26, respectively. The free end of the shaft extends outwardly to a length approximately the width of the base member 10. The free end of shaft 24 has mounted thereto a pair of axially spaced-apart chain sprockets 28 and 30 for engaging a continuous chain belt 32 having mounted thereto a plurality of laterally and longitudinally spaced female dies 34.

The chain belt is supported at the other end of the base member by engagement with a pair of sprockets 36 and 38 mounted to a second shaft 26 which is received and supported by a second set of pillow blocks 20 and 22 extending outward and away from the second support member 16. The sprockets 36 and 38 are in spacial alignment with and in the same plane as the sprockets 28 and 30 attached to shaft 24.

In addition to carrying sprockets 28, 30 and 36, 38, each shaft 24 and 26 respectively is adapted for carrying a stationary pressure frame assembly 40 journaled to permit rotation of the shafts therein. The pressure frame assemblies 40 are connected by an overriding slide plate 42. As the shafts and sprockets are rotated, the engaged chain belt 32 is moved and the female dies 34 attached thereto are slideably carried along the top side of the stationary slide plate 42.

A male die housing assembly 52, adapted to house a family of longitudinally spaced male dies fixed to a bracket 51 is mounted to the upstanding, rectangular framed assembly 16. The bracket 51 and the male dies 50 attached thereto are adapted for reciprocal, up and down action by means of a pair of hydraulic pistons 95 and 96 supported from the rectangular frame assembly 16. The longitudinal movement of the female dies and the reciprocating action of the male dies are synchronized such that the male dies can ill mate with the female dies as they become positioned therebelow. To insure that the male dies are in exact alignment with the female dies, a pair of aligning guide plates 54 containing vertical slots 56 are fixed to the underside of the bracket 51. The vertical slots of the aligning guide plates are adapted to engage a knob 58 protruding out from the side walls of the two outside mounted laterally spaced female dies 34. As the slots 56 engage the knobs 58, the position of the female dies, if necessary, is rearranged along a longitudinal plane to insure that the laterally spaced female dies are in exact alignment with the family of male dies positioned overhead. The male dies are then reciprocally actuated by either manual or preferably automatically by hydraulic means. Electrical or pneumatic means may also be employed is so desired.

Prior to the movement and positioning of the female dies to permit mating with the male dies, the female dies are filled with a molten mix from an insulated feeding vessel 60 which is mounted to the upstanding rectangular framed assembly 16. The insulated vessel 60 is adapted with electrical strip heaters 62 for heating and melting a dry powder mix introduced and stored therein. The mix may comprise a broad variety of meltable materials. However, if frangible targets are the desired product, the mix will normally contain between about 40–60 percent by weight of pitch or materials equivalent thereto with the balance comprising a filler, such as limestone and the like. Supplementary binding materials, such as thermoplastics, may also be added to the base mix if desired.

As earlier indicated, the dry mix is stored within the vessel and heated to a temperature slightly above the mix's melting point by electrically energizing the strip heaters. Electrically driven paddles (not shown) are mounted within the tank on a drive shaft assembly 64. The vessel is also provided with a plug 66 for draining the vessel of the melted mix whenever cleaning of the vessel is required.

The melted mix is quantatively introduced into each of the female dies through a number of nozzles 61 positioned beneath and in communication with a multi-chambered charge system 68. Each of the chambers in the charge system is identical and thus will contain an identical volume of melted mix for deposit into each of the female dies. When the female die 34 is in position beneath the charge chamber, a slide bar 70 is actuated permitting the melted mix to pass from the charge chamber and through the nozzles 61 into the female dies. After the desired amount of heated mix has been introduced into each of the female dies, the slide bar is closed either manually or automatically in response to a signal transmitted from a timer. The female dies are then moved forward and into alignment with the male dies. The male dies are actuated, forcing them downward under pressure for mating with the female dies and thereby completing the molding process. After a period of a few seconds, the male dies are retracted and the female dies are moved forward by the chain sprocket system earlier described. The above sequence of steps is repeated for each subsequent grouping of female dies such that as one group of female dies is being filled with a melted mix, a preceding series of female dies which have already been already filled with molten mix are being mated with a family of male dies.

Figure 2:
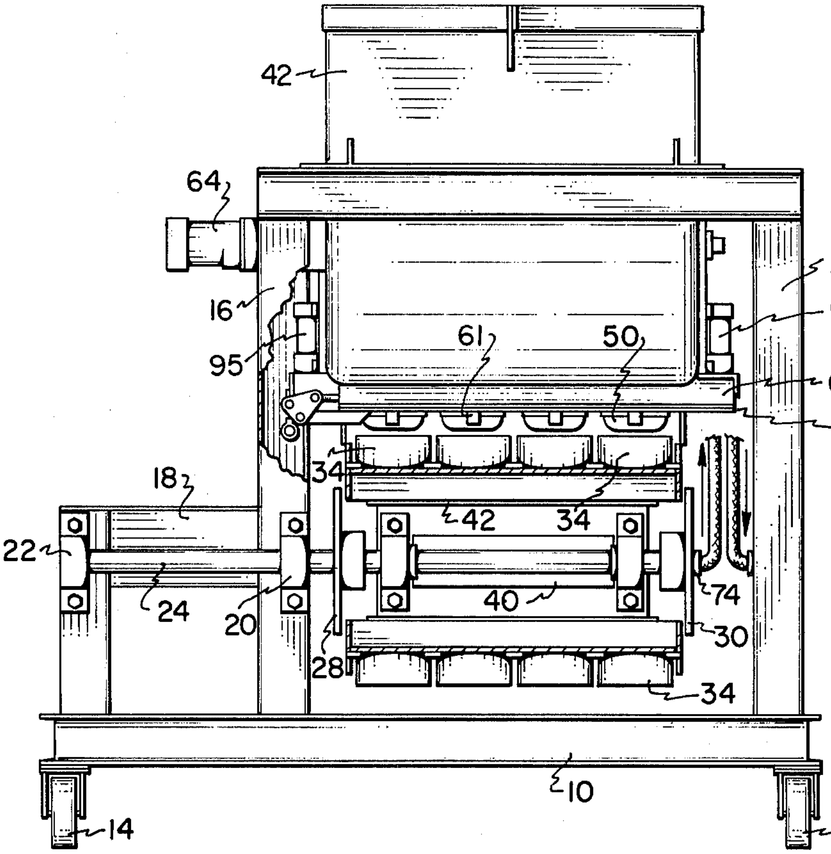
FIG. 2 is a front view of the molding apparatus taken along line 2—2 of FIG. 1 with parts of the apparatus broken away for clarity.
Figure 4:
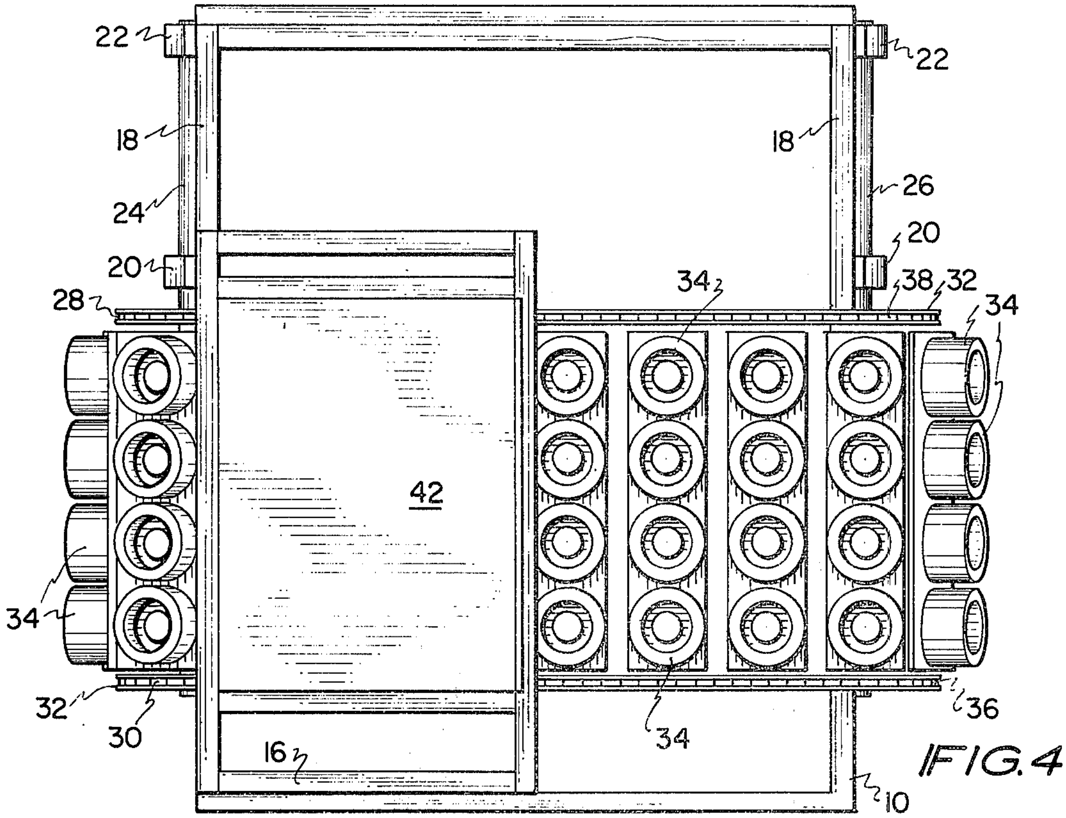
FIG. 4 is a top view of the molding apparatus shown in FIG. 1.

As is shown in the drawings, and particularly FIGS. 1 and 2, the preferred embodiment of this invention encompasses a series of female and male dies positioned in both a lateral and longitudinal plane. As is shown, a plurality of female dies are mounted to the conveyor chain in an evenly spaced relationship to each other along a lateral and longitudinal plane. The number of dies on the chain can, of course, vary depending upon the production capacity desired. In the embodiment shown, four female dies are laterally spaced, while 18 dies are mounted longitudinally, for a total of 72 female dies. Generally the number of male dies which would be used in the above system would correspond to the number of female dies laterally mounted, which in the embodiment shown are four. Since there are four male dies, an equal number off charge chambers would also be required to allow for each of the four laterally spaced female dies to be filled simultaneously with melted mix.

Figure 3:
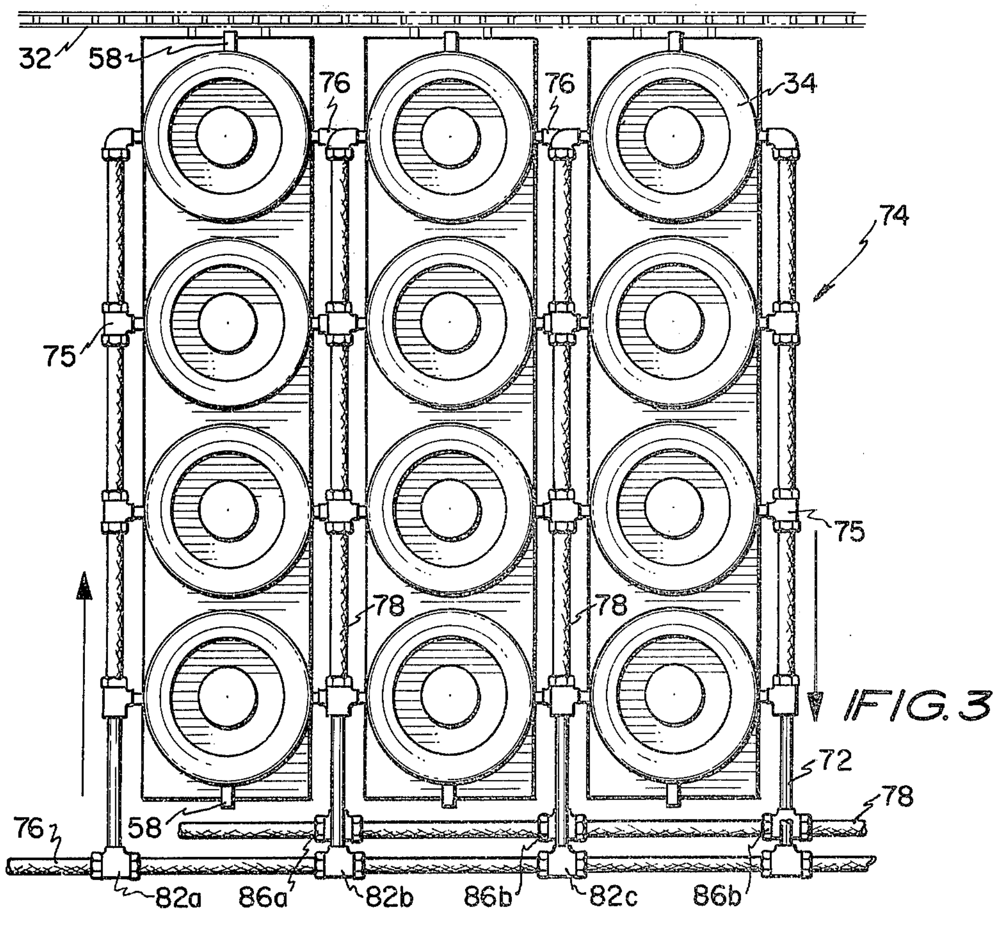
FIG. 3 is an enlarged top view showing the relationship of the female dies and its water cooling system.

To insure that the molded products are cooled at a given and constant rate and thereby insure that the molded products will have essentially identical frangible characteristics, the female dies are adapted with internal channels (not shown) for conducting cooling water therethrough. As is shown in FIG. 3, the female dies mounted on the conveyor chain are interconnected through their internal channels by a series of interconnecting, liquid cooling systems generally shown by numeral 74. The cooling systems are arranged in a manner such that each female die receives cooling water maintained at essentially the same temperature, thereby insuring that each die is cooled to essentially the same temperature and at essentially the same cooling rate.

The cooling water is introduced into the female dies by means of T's 75 connected to branch conduits 78. The branch conduits are connected in parallel to the main conduit 76 through T's **82*a*, 82*b*, 82*c*, etc. After the cooling water has been circulated through each of the female dies, the water is removed therefrom via T's 75, branch conduits 72 and outlet line 78 which in turn is connected by T's 8*a*, 86*b*, 86*c*,** etc. to either waste or to a water recycling system. The movement of the water is depicted in the drawings by the directional arrows.

The water-carrying conduits are constructed from a flexible material, permitting the conduits to follow the female dies as the chain belt is moved across the sprockets. At a point where the cooling water enters the hose, a flexible conduit 71 or swivel or other rotatable liquid distribution header is provided. The pressurized inlet cooling water enters the swivel or rotatable header from a pressurized source through line 72 and into the cooling system above described. The water passes from the output line 76 through a second swivel (not visible in the drawings), which is identical to the first, and then on to waste.

Figure 5:
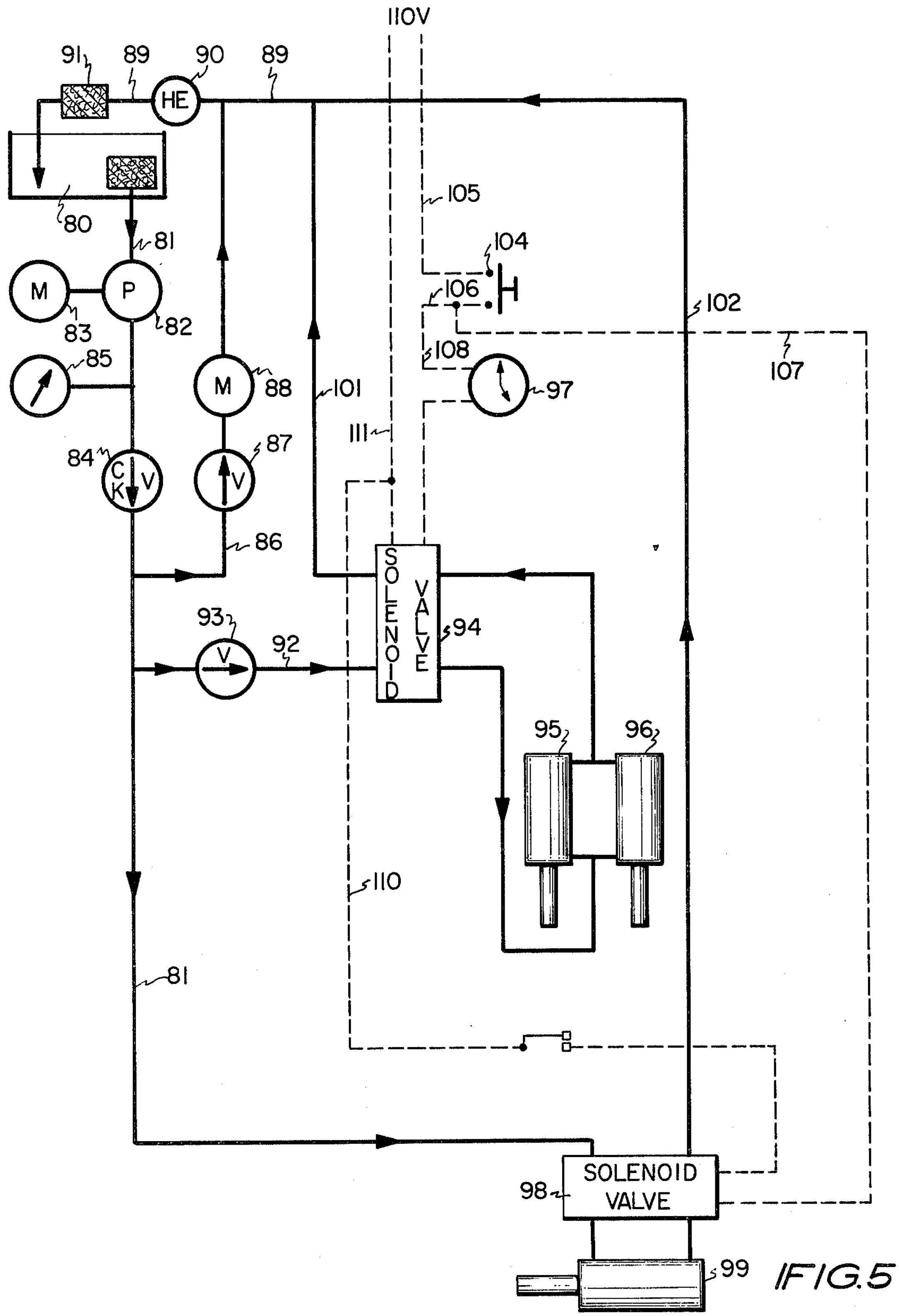
FIG. 5 is a schematic showing the hydraulic and electrical features of this invention and their interrelationship with each other.

The automated, hydraulic version of this invention is schematically shown in FIG. 5. As shown, the hydraulic fluid is stored in reservoir 80 and pumped through line 81 by means of a pump 82 driven by an electric motor 83. The flow in line 81 is controlled by a manually operated valve 84. The pressure within the line is measured by a pressure gauge 85. Part of the hydraulic fluid which enters a branch line 86 through valve 87 is used to operate a hydraulic motor 88. The oil is returned to the reservoir through line 89. All of the hydraulic fluid in the system which returns to the reservoir passes through a heat exchanger 90 and a hydraulic fluid filter 91 connected to line 89. Another segment of the hydraulic fluid enters a branch line 92 which has positioned therein a float control valve 93 and a solenoid actuated valve 94.

When the solenoid actuated valve is opened, the hydraulic fluid passes on through and into a pair of hydraulic cylinders 95 and 96. (Also see FIGS. 1 and 2.) These cylinders are interconnected with the male dies, forcing the male dies downward to mate with the female dies whenever the solenoid valve is actuated. After a period of time, as will be determined by an electrical timer 97, the male die is retracted. The other segment of hydraulic fluid is carried through line 81, and when a second solenoid actuated valve 98 is opened, the hydraulic fluid enters another hydraulic cylinder 99, which is the moving force for the chain belt having fixed thereto the female dies. As is shown in FIG. 1, the hydraulic piston and cylinder 99 has a carrier latch 100 connected at one end of the piston. As the cylinder is filled with hydraulic fluid, the piston is extended, moving the latch against the section of the female die 34 forcing the chain belt about the sprocket wheels. After the female dies have been positioned beneath the charge chamber 68 (FIG. 1 and 2), as will be determined by the electrical timer 97, the piston is retracted and the carrier latch repositioned behind a second series of female dies 34, and the above sequence is repeated. Concomitantly therewith, the die which has been charged with melted mix is moved forward beneath the male die 50. When the solenoid valve 94 is opened, the hydraulic pistons 95 and 96 are actuated, forcing the male dies downward in mating contact with the female dies. The hydraulic fluid from the hydraulic cylinders is returned to the reservoir via lines 101, 102 and 89.

In FIG. 5 the dotted lines represent the electrical system which actuates the solenoid valves 94 and 98 as well as the timer 97. The electrical system is actuated by depressing switch 104. When the switch has been depressed, current flows from a 110 volt AC source through lines 105 and 106 and thence into branch lines 107 and 108. From each of the branch lines, the current passes through and actuates solenoid 98 and 94, respectively. The above circuit is completed by return lines 110 and 111 leading from each of the two solenoid valves 94 and 98.

While the invention has been described with reference to specific embodiments, it should be understood that certain changes may be made by one skilled in the art. It would not thereby depart from the spirit and scope of this invention which is limited only by the claims appended hereto.

I claim:

1. Apparatus for molding frangible targets from a hot melt, comprising:

a supporting frame including an elongated horizontally disposed support surface;

a continuous belt mounted within said supporting frame for movement in a loop around said support surface such that the belt passes horizontally over and adjacent said support surface;

a plurality of female dies, each having internal cooling channels and constituting means for forming a first side of a frangible target, said female dies being carried by said continuous belt in a series of groups, with the individual dies of each group arranged in a pattern transverse the outer surface of said loop;

belt driving means for advancing said groups of female dies intermittently around said loop so that each said group is positioned for an interval at selected locations in the following sequence:

a filling station, with the female dies of a group located atop said loop oriented to receive a charge of hot melt, a target-forming station with the female dies of said group located atop said support structure, a target discharge station with the female dies of said group oriented to discharge their contents;

hot melt discharge means mounted above said frame support in the vicinity of said filling station and including means for introducing a substantially identical metered amount of hot melt into each of the female dies in a said group positioned at said station;

an array of male dies, corresponding in number and arrangement to the female dies within said group mounted above said support surface in the vicinity of said target-forming station for reciprocative mating with said female dies after said female dies are charged with hot melt, said male dies constituting means for forming a second side opposite said first side of a frangible target; and means for introducing coolant to the internal cooling channels of each said female die at approximately the same temperature and at approximately the same rate, constituting means for cooling said female dies approximately identically to produce frangible targets of approximately identical frangible characteristics.

2. Apparatus according to claim 1 wherein each group of female dies is arranged as a row transverse said belt, and the belt carries similar such groups evenly spaced around the entire belt loop.

3. Apparatus according to claim 2 wherein said belt driving means includes chain driven sprockets powered to move said belt a selected distance after a selected interval, said interval being sufficient to permit a first group of female dies to be charged with holt melt and a second group of female dies to reciprocally mate with said male dies while all of said female dies remain stationary on said belt.

4. The apparatus of claim 3 wherein said belt driving means includes a hydraulic piston.

5. The apparatus of claim 4 wherein said hydraulic piston includes a means for actuating said hydraulic piston on a regular and repeating basis.

6. The apparatus of claim 1 including a means for automating said molding apparatus, said means including an electrical timing system for transmitting signals to move said belt, for filling said female dies with said melt and for mating said male dies with said female dies, all in a synchronous manner.

7. The apparatus of claim 6 wherein movement of said belt and mating of said male dies with said female dies are periodic and such periodic movement is accomplished by hydraulic means.

8. The apparatus of claim 1 including a means for synchronizing the movement of said female dies and said male dies.

9. Apparatus according to claim 1 wherein said hot melt discharge means includes nozzles coresponding in number and arrangement with the female dies of a group in communication with a multi-chambered charge system of which seperate chambers associated with each said nozzle have approximately identical capacities.

* * * * *